United States Patent [19]
Biessener

[11] 3,830,164
[45] Aug. 20, 1974

[54] TOW TRUCK

[75] Inventor: Richard M. Biessener, Faribault, Minn.

[73] Assignee: Nutting Truck and Caster Company, Faribault, Mich.

[22] Filed: July 21, 1972

[21] Appl. No.: 273,937

[52] U.S. Cl............. 104/170, 104/88, 104/172 BT
[51] Int. Cl........................................... B61l 13/02
[58] Field of Search ....... 104/88, 170, 172 BT, 178; 213/217, 219

[56] References Cited
UNITED STATES PATENTS

| | | | |
|---|---|---|---|
| 167,718 | 9/1875 | Wernimont | 213/219 |
| 3,262,397 | 7/1966 | Bradt | 104/88 |
| 3,559,584 | 2/1971 | Frantz | 104/88 |
| 3,618,530 | 11/1971 | Swartz | 104/172 BT |
| 3,693,552 | 9/1972 | Brown et al. | 104/172 BT |

Primary Examiner—M. Henson Wood, Jr.
Assistant Examiner—Robert Saifer
Attorney, Agent, or Firm—Dorsey, Marquart, Windhorst, West & Halladay

[57] ABSTRACT

A tow truck is disclosed in which a tow pin is supported for relative movement between a conveyor-engaging position and a retracted position. The tow truck has a selector rod support for selectively and removably holding at least one selector rod in any one of at least two laterally spaced switching locations at either side of the path along which the truck is to be moved by engagement of the tow pin. A manually operable tow pin retracting member is movable between operating and retracting positions and is connected to the tow pin so that movement of the retracting member to retracting position moves the tow pin to retracted position. The selector rod support includes a fixed crossbar extending laterally across the truck above the selective switching locations for the selector rod, and the selector rod is connected by a flexible connecting member to a retaining member slidably supported on the crossbar, so that the selector rod and its associated members can be moved selectively across the truck to either side of the tow pin axis without removal of the retracting member from the fixed crossbar. The tow pin retracting member includes a movable crossbar portion which engages and displaces a portion of the flexible connecting member for the selector rod, regardless of the selected switching location of that rod, whenever the tow pin retracting member is manually operated to retract the tow pin. The displacement of the flexible connecting portion moves the selector rod from a switching position to a retracted position.

8 Claims, 2 Drawing Figures

PATENTED AUG 20 1974 3,830,164

TOW TRUCK

BACKGROUND OF THE INVENTION

Tow trucks are well known in which the truck is movable along a pre-selected path by engagement of a suitable tow pin mounted on the truck with an appropriate conveying member mounted either in the supporting floor below the truck or in an overhead location above the truck. Such trucks have been provided with manually operable members for retracting, e.g. lifting, the tow pin from its operative conveyor-engaging position to a retracted or inoperative position.

Such trucks have also been provided with one or more selector rods or switch actuating probes, which are adapted to be selectively positioned at different lateral locations on the truck for selective engagement with suitable switch actuating members mounted, for example, on the supporting floor alongside the floor conveyor path, to divert the tow pin and truck from a main conveyor path to a selected shunt path or auxiliary conveyor. Provisions have also been made in the prior art for moving such selector rods from their operative switching positions to retracted positions, and also for selectively moving such rods laterally from one switching location to another. It has been customary, however, to limit lateral positions of such a selector rod to either one side or the other of the tow pin and conveyor path without making provision for convenient movement of such a selector rod to selective positions on opposite sides of the tow pin without disconnecting of the selector rod from the truck. In effect, such selector rods have connected by chains or other flexible members to supporting brackets secured at the respective sides of the tow pin, and it was not convenient, or even possible in some cases, to move the selector rod from one side of the tow pin to the other without disconnecting it entirely.

SUMMARY OF THE INVENTION

The present invention provides a tow truck construction with an improved arrangement for moving a tow pin from conveyor engaging position to retracted position and for also moving one or more selector rods on the tow truck from an effective switching position to a retracted position by means of a movable portion on a tow pin retracting member which engages and displaces a portion of a flexible connecting member connected to the selector rod. Preferably, the selector rods are supported on the tow truck in such a manner that a given selector rod can be selectively positioned at switching locations spaced at either side of the tow pin without completely disconnecting the selector rods from the truck, and in which manual operation of the tow pin retracting member to retract the tow pin will also retract the selector rods regardless of their relative lateral switching positions on the truck. In its preferred form, the invention includes upper and lower selector rod supports in which the lower support selectively and removably holds the selector rod in any one of at least two laterally spaced selective switching locations, one of which is located at one side and another of which is located at the opposite side of the tow pin. The upper selector rod support includes a fixed crossbar which extends laterally entirely across the portion of the truck above the selective switching locations for the selector rods. Each selector rod is connected by a flexible connecting member to a retaining member which is slidably supported on the crossbar, so that the selector rod and its associated parts can be moved to any of the switching locations on either side of the tow pin without disengagement of the selector rod and its connecting member and retaining member from the upper support.

According to the preferred form of the invention, a manually operable tow pin retracting or control member for selectively moving the tow pin to retracted position includes a movable crossbar portion. The movable crossbar has a location relative to the upper crossbar support for the selector rod, such that movement of the tow pin control member to retracting position will cause engagement of the movable crossbar portion against the flexible connecting members of the selector rods, no matter what their lateral position on the truck may be, thereby lifting the selector rods in response to the displacement of the flexible connecting members by the movable crossbar. In one specific embodiment, the tow pin control member includes a manually operable crossbar portion to which the tow pin is connected by a further connecting member and which is supported by crank arms for pivotal movement on a horizontal axis parallel to the upper crossbar support for the selector rods, such axis being also displaced horizontally from the upper crossbar selector rod support. The movable crossbar portion for the tow pin lifting member is then movable between an operative position beneath its pivotal supporting axis and a retracted position in which the movable crossbar is swung upwardly above its axis and slightly toward the fixed support of the selector rods. In this position, the weight of the tow pin is effective an as "over-center" locking arrangement to retain the tow pin lifting member in its retracted position and thereby also hold the selector rods in their retracted positions.

BRIEF DESCRIPTION OF THE DRAWING

In the drawings which form a part of this application, and in which like reference characters indicate like parts.

DESCRIPTION OF THE PREFERRED EMBODIMENT

Figure 1:
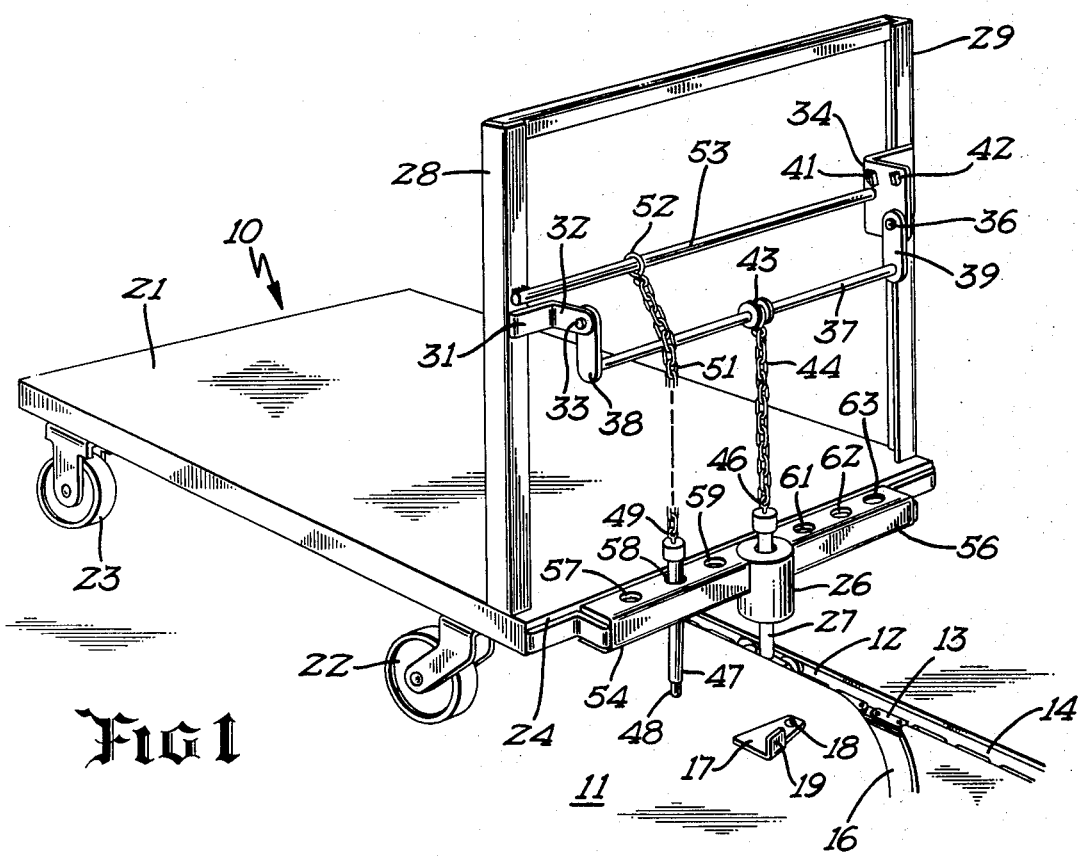
FIG. 1 is a perspective view of a tow truck embodying a preferred form of the present invention, with both its tow pin and a selector rod in their relative operating positions; and, FIG. 2 is a partial perspective view similar to FIG. 1 showing the tow pin control member in retracting position, in which both the tow pin and selector rods are effective held in their respective retracted positions.

A preferred embodiment of the invention is illustrated in FIG. 1 in which a tow truck 10 is adapted for movement on a supporting floor 11 along a desired path determined by the direction of a so-called floor conveyor which is mounted below the surface of the floor in a conveyor slot 12. Such a conveyor, a portion of which is shown at 13, generally moves along a main conveyor slot or path 14, and such conveyor slots may be provided with one or more branches or shunt paths, as shown at 16. Diversion of such a truck into one of the shunt paths is controlled by one or more floor switch members 17, pivoted at 18, and having actuating portions 19 for engagement by a suitable control probe or selector rod mounted on the truck as will be further described herein.

The truck itself includes a floor or body portion 21 which is adapted to carry the desired load of product. Truck body 21 is provided with suitable casters or wheels 22 and 23 for convenient movement of the truck on supporting floor 11. Customarily, the forward supporting casters 22 are pivotally mounted on a vertical axis, so that the direction of the front end of the truck can readily change as needed to follow the path established by the conveyor slot 12, 14, and 16. The rear supporting wheels 23 normally have fixed transverse axes of rotation, so that the rear of the truck will merely follow the general path along which the front of the truck is guided.

To provide a driving connection between truck 10 and conveyor 13, the front of the truck 24 is provided with a supporting bracket 26 for a vertically movable tow pin 27. When tow pin 27 is extended downwardly into conveyor slot 12, it can be engaged by driving members on the floor conveyor 13 to propel the truck along the desired path. When the tow pin 27 is moved upwardly to a relatively retracted position, the lower end of the tow pin will be out of engagement with the conveyor member 13, so that the truck can come to a stop. Such a retracted position may be either partial or complete, i.e., the pin 27 may be moved vertically just far enough to disengage the conveyor chain, but may remain low enough to engage the slot 12 so that the conveyor will remain in position for further driving engagement. In most cases, however, provision will be made for lifting the tow pin to a fully retracted position, where its lower end will be above the level of floor 11, so that the truck can be manually pushed to any desired location on the floor, regardless of the position of the conveyor slots.

For this purpose, a tow pin retracting or control member is suitably mounted at the front end of the truck by means of front supporting posts 28 and 29 at the forward corners of the truck. A bracket 31 on post 28 includes a forwardly extending portion 32 provided with a supporting pivot at 33 having an axis of rotation extending transversely across the truck. Another supporting bracket 34 on the opposite post 29 provides another pivotal support 36 on the same axis. The manually operable tow pin control or lifting member includes a manually engageable movable crossbar portion 37 which extends across the truck and has rigid crank or lever arms 38 and 29 pivoted to the respective pivot points 33 and 36. Thus, the movable crossbar 37 can be manually grasped and moved as a unit in rotation around the axis determined by the pivots 33 and 36.

As shown in FIG. 1, tow pin control member 37 is in its normal operating position in which it is located immediately below the pivotal axis 33, 36. The member 37 can then be swung forwardly, upwardly and then rearwardly, through an arcuate path slightly greater than 180°, to the position of FIG. 2 in which its final position is determined by engagement of crank arm 39 against a stop 41 on bracket 34. A latch or spring retaining arm 42 may also be mounted on bracket 34 to assist in holding the arm 39 and its associated parts in the position of FIG. 2.

A retaining ring 43 for the tow pin is mounted on the crossbar 37 and is connected by a flexible chain or other connecting member 44 to the upper end of the tow pin at 46. Thus, when the member 37 is swung from the position of FIG. 1 to the position of FIG. 2, the connecting member 44 will lift the tow pin 27 from its downwardly-projecting, conveyor-engaging position to its upper retracted position.

Figure 2:
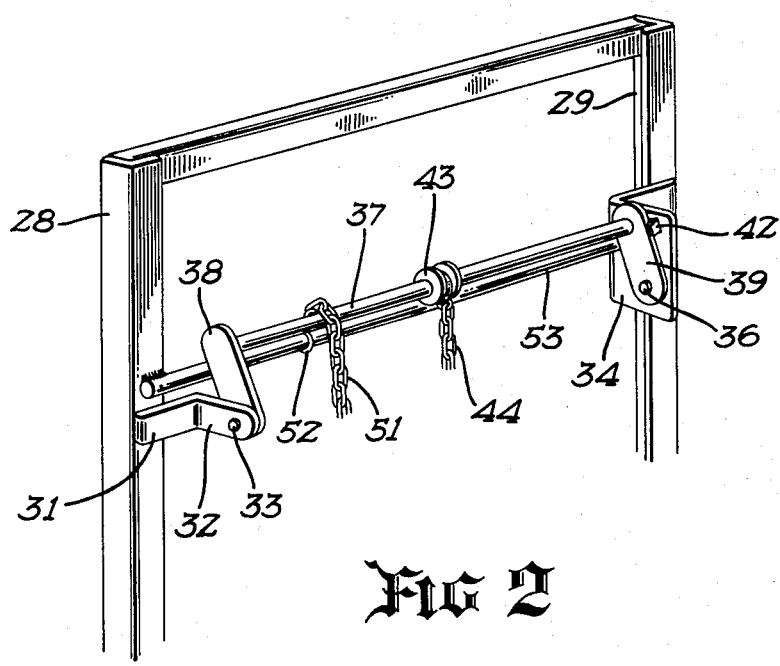

As noted, the relative location of stop 41 is at such a point that the crank arms 38 and 39, in moving from the position of FIG. 1 to the position of FIG. 2, move slightly more than 180° from their vertically downwardly projecting position in FIG. 1 to their upwardly and slightly rearwardly projecting positions in FIG. 2. Thus, the axis of crossbar portion 37, and the point of connection at 43 for the tow pin chain, are effectively moved past a top dead-center position, so that — as shown in FIG. 2 — the weight of the tow pin on the tow pin connecting chain will also be effective in holding the crossbar portion 37 and crank arms 38 and 39 in the position of FIG. 2 with arm 39 held firmly against stop 41. The weight of the selector rods, described below also holds crossbar 37 in retracting position.

The tow truck 10 is further provided with at least one selector rod or switch probe 47 which is adapted for mounting at one or more selected locations, so that the lower end 48 of such a selector rod can engage the appropriate portion 19 of a switch actuator 17 at the point where it is desired to divert a particular truck 10 from a main conveyor slot 12, 14 to a branch 16. The upper end of the selector rod 47 is connected at 49 to a flexible connecting member or chain 51, the upper end of which is connected to a retaining member 52. Member 52 is illustrated as a ring member slidably supported on a fixed crossbar 53 which serves as the upper support for the selector rod 47. Crossbar 53 is rigidly connected to the supporting posts 28, 29 or to appropriate brackets thereon and extends transversely entirely across the portion of the truck body above the desired selective switching locations for the selector rods. Retaining member 42 and flexible connection 51 keep each selector rod relatively permanently connected to the truck at all times, so that said selector rods will not be lost or mislaid and will not be inadvertently left around the floor where they could accidentally engage the conveyor mechanism or cause injury to an operator or damage to a truck. This upper support 53 is specifically located rearwardly of the axis 33, 36 on which the tow pin lifting member 37 is pivoted. The relative location is such that each flexible connecting member extends from its retaining member over and downwardly in front of the movable crossbar 37 and thence to its respective selector rod. Thus, crossbar portion 37 of the tow pin control member engages the flexible supporting chain 51 of the selector rods as shown at FIGS. 1 and 2. Lifting movement of the control member 37 from the position of FIG. 1 to the position of FIG. 2 displaces and effectively lifts part of each selector rod chain 51 as shown in FIG. 2 and thereby moves the selector rod upwardly to a retracted position, whenever the tow pin is similarly lifted.

In order to position each selector rod at a desired selective switching location, the truck includes a lower selector rod support, which is illustrated in the form of a U-shaped channel member which has portions 54 and 56 extending transversely across the truck at opposite sides of the tow pin support 26. The lower selector rod supports 54 and 56 include transversely spaced openings 57, 58, 59, 61, 62, and 63, which define the relatively laterally spaced selected switching locations in which one or more of the selector rods 47 can be mounted. Although the openings 57, etc. are shown only in the upper horizontal portion of channel members 54 and 56, it will be understood that similar openings can be provided in the lower horizontal flange of these support members in direct vertical alignment below the openings which are shown. Supports 54 and 56 may be rigidly or pivotally supported in known manner depending on the particular desired arrangement and method of operation of the selector rods and the switch members to be activated by them.

The preferred embodiment of the invention as described thus provides a construction in which a selector rod is suspended from an upper support by a flexible connecting member, and in which a movable portion of a manually operable tow pin retracting member engages and displaces a portion of the flexible connecting member to retract the selector rod when the tow pin retracting member is moved to retract (e.g. lift) the tow pin. In this embodiment, at a desired switching location on either side of the tow pin, i.e., at either side of the path along which the tow pin and truck is propelled, as determined by the location of the floor conveyor slot 12. Moreover, the selector rod, although connected at all times to the truck, may be moved from one side of the truck to the other, as needed, yet the tow pin control member with its crossbar portion 37 will effectively engage the flexible connecting member of any and all of the selector rods which are relatively permanently attached to the truck. The particular arrangement and relative location of the selector rod supporting crossbar and the movable crossbar of the tow pin lifting member further contribute to a relatively simple and economical form of construction in which the parts can be readily positioned in either the operating position shown in FIG. 1 or in the retracted position shown in FIG. 2.

The foregoing specification accordingly describes the nature and principles of the present invention and some of the constructions by which it may be put into effect, including the best mode presently contemplated for practicing the invention.

I claim:

1. A tow truck adapted for movement along a path defined by a longitudinally movable conveyor, said tow truck having a tow pin supported thereon for relative vertical movement between a conveyor-engaging position and retracted position, at least one selector rod, a lower selector rod support on the truck for holding the selector rod in any one of at least two laterally-spaced selective switching locations, the lower selector rod support guiding and supporting the selector rod for relative vertical movement between a lower switching position and an upper retracted position at each selective switching location, an upper selector rod support member on the truck extending across and at a level above the selective switching locations, a retaining member for the selector rod slidably secured to the upper support member, a flexible connecting member connected between the selector rod and its retaining member and providing for selective removal of the selector rod from one switching location to a laterally-spaced switching location without disengagement of the retaining member from the upper selector rod support member, a tow pin retracting member operatively connected to the tow pin and movably supported on the truck for movement between an operating position in which the tow pin is positioned in its conveyor-engaging position and a retracting position in which the tow pin is positioned in its retracted position, said tow pin retracting member including a separate movable portion which extends across and above the selective switching locations and which engages and displaces an intermediate portion of the flexible connecting member at each selective switching location of the selector rod in response to movement of the tow pin retracting member from operating to retracting position, the displacement of the flexible connecting member effectively lifting the selector rod to retracted position at each of its selective switching locations.

2. A tow truck according to claim 1 in which the lower selector rod support includes laterally-spaced supporting portions selectively and removably supporting a selector rod in any one of at least two laterally-spaced selective switching locations, one of which is located at one side of the path and another of which is located at the opposite side of the path, the construction and relative location of the upper selector rod support, retaining member, and flexible connecting member providing for selective removal of the selector rod from a switching location at one side of the path to a switching location at the other side of the path without disengagement of the retaining member from the upper selector rod support member, and the tow pin retracting member having a movable portion which engages and displaces an intermediate portion of the flexible connecting member at each selective switching location of the selector rod in response to movement of the tow pin retracting member from operating to retracting position.

3. A tow truck according to claim 2 in which the upper selector rod support member comprises a fixed crossbar extending laterally across the truck and path above the selective switching locations and in which the selector rod retaining member is secured to the crossbar for sliding lateral movement along the crossbar when the selector rod is moved from one selective switching location to another.

4. A tow truck according to claim 3 in which the movable portion of the tow pin retracting member comprises a movable crossbar extending laterally across the truck and path at a relative location adapted for engagement and displacement of the flexible connecting member to lift the selector rod to retracted position at each of its selective switching locations.

5. A tow truck according to claim 4 in which the movable crossbar is parallel to the fixed crossbar and is supported for rotation on a transverse axis which is parallel to the first crossbar and is also spaced longitudinally of the truck from the first crossbar at a height close to the height of the first crossbar.

6. A tow truck according to claim 5 in which the movable crossbar is carried by a fixed crank arm at each of its ends, said crank arms being pivotally supported for rotation on said transverse axis between an operating position in which the crank arms extend downwardly with the movable crossbar below said axis, and a retracting position in which the crank arms extend upwardly with the movable crossbar above said axis, in which the tow pin is movable between a lower conveyor-engaging position and an upper retracted position, and in which a further connecting member is connected between the tow pin and the movable crossbar for lifting the tow pin in response to movement of the crossbar to retracted position.

7. A tow truck according to claim 6 in which the movable crossbar is positioned directly below the transverse axis and each flexible connecting member extends from its retaining member over and downwardly in front of the movable crossbar to its respective selector rod when the tow pin retracting member is in its operating position, and in which the movable crossbar is movable forwardly, upwardly and then rearwardly around said transverse axis through an arcuate path slightly greater than 180° to an overcenter position above said axis and above said fixed crossbar, thereby lifting the intermediate portion of each flexible connecting member above said axis and above the fixed crossbar when the tow pin retracting member is moved into its retracting position, and the weight of the tow pin and selector rods on said connecting members and movable crossbar holding the movable crossbar and tow pin retracting members in their retracting position.

8. A tow truck according to claim 7 in which the further connecting member connected between the tow pin and movable crossbar is a flexible connecting member.

* * * * *